(12) United States Patent
Kosar

(10) Patent No.: US 8,971,877 B2
(45) Date of Patent: Mar. 3, 2015

(54) SYSTEM AND METHOD FOR RELAYING AN ORIGINATION REQUEST FROM A HOME LOCATION REGISTER TO A SERVICE SPECIFIC SERVICE CONTROL POINT

(75) Inventor: Erik Kosar, Rockwall, TX (US)

(73) Assignee: MetroPCS Wireless, Inc., Richardson, TX (US)

( * ) Notice: Subject to any disclaimer, the term of this patent is extended or adjusted under 35 U.S.C. 154(b) by 376 days.

(21) Appl. No.: 12/892,998

(22) Filed: Sep. 29, 2010

(65) Prior Publication Data

US 2012/0077489 A1 Mar. 29, 2012

(51) Int. Cl.
| | |
|---|---|
| H04W 4/00 | (2009.01) |
| H04W 8/12 | (2009.01) |
| H04Q 3/00 | (2006.01) |
| H04W 88/18 | (2009.01) |

(52) U.S. Cl.
CPC ............... *H04W 8/12* (2013.01); *H04Q 3/0029* (2013.01); *H04W 88/18* (2013.01)
USPC ...................... 455/432.3; 455/432.2; 455/433

(58) Field of Classification Search
CPC .................................. H04W 4/20; H04W 8/18
USPC ...................... 455/14.1–422.1, 426.1–435.3, 455/455–456.6, 466, 560, 561; 370/310.2, 370/328, 338, 352–356, 522; 379/9, 379/15.01–15.04, 70, 201.01–218.02, 220, 379/228–230
See application file for complete search history.

(56) References Cited

U.S. PATENT DOCUMENTS

| | | | | |
|---|---|---|---|---|
| 6,298,234 | B1 * | 10/2001 | Brunner ...................... | 455/432.1 |
| 6,490,449 | B1 * | 12/2002 | Thibert et al. ................ | 455/433 |
| 6,615,042 | B1 * | 9/2003 | Britt et al. ..................... | 455/433 |
| 2009/0129318 | A1 * | 5/2009 | Xu et al. ........................ | 370/328 |

* cited by examiner

*Primary Examiner* — San Htun
(74) *Attorney, Agent, or Firm* — Howison & Arnott, LLP

(57) ABSTRACT

A method for relaying a call message requiring a particular service from an MSC to a service logic unit, involves the steps of receiving a service request trigger to provide a particular service at the MSC from a subscriber. The call message requiring a particular service is transmitted from the MSC to an HLR. The HLR determines the service logic unit to provide the particular service responsive to at least one of the call message requiring a particular service, a trigger indication and a subscriber profile associated with the subscriber. The call message requiring a particular service is transmitted from the HLR to the determined service logic unit.

15 Claims, 4 Drawing Sheets

FIG. 4a

| 402 | 404 | 406 | 408 | 410 | 412 | 414 | 416 | 418 |
|---|---|---|---|---|---|---|---|---|
| BILLID | MIN | ESN | MSCID | PC_SSN | DGTSDIAL | ORIGTRIG | TRANSCAP | MSCIN |

FIG. 4b

| 402 | 404 | 406 | 408 | 410 | 412 | 414 | 416 | 418 | 420 |
|---|---|---|---|---|---|---|---|---|---|
| BILLID | MIN | ESN | MSCID | PC_SSN | DGTSDIAL | ORIGTRIG | TRANSCAP | MSCIN | SENDRIN |

FIG. 4c

| 422 | 424 | 426 | 428 | 430 |
|---|---|---|---|---|
| TERMTRIG | ACTCODE | ANNLIST | RoutingInfo | DMHDATA |

SYSTEM AND METHOD FOR RELAYING AN ORIGINATION REQUEST FROM A HOME LOCATION REGISTER TO A SERVICE SPECIFIC SERVICE CONTROL POINT

TECHNICAL FIELD

The present invention relates to origination requests (ORREQ) within a wireless communication network, and more particularly, to the transmission of origination requests from an HLR to an SCP within a wireless communication network.

BACKGROUND

Within a wireless communication network, an origination request (ORREQ) operation is used to request call origination treatment on behalf of a registered mobile device. The origination request is relayed by an intervening home location register (HLR) to enable a subscriber to access a wireless intelligent network (WIN) service within a particular service control point located separately from the subscriber's HLR that implements a particular service logic program.

Within presently configured ORREQ protocol, the ORREQ is transmitted from the mobile switching center (MSC) that is presently serving the mobile device making the call to the HLR associated with the mobile device. The HLR forwards the ORREQ on to an SCP that utilizes the parameters within the ORREQ to determine the particular services required by the origination request. The SCP determines the specific SCP that is able to provide a particular service and forwards the ORREQ to the service specific SCP. This process requires the forwarding of the ORREQ to the initial SCP prior to transmission to the service specific SCP which increases system bandwidth requirements and provides delays in call processing.

SUMMARY

The present invention as disclosed and described herein, in one embodiment thereof, further comprises a method for relaying a call message requiring a particular service from an MSC to a service logic unit. A service request to provide a particular service is received at the MSC from a subscriber. The call message requiring a particular service is transmitted from the MSC to an HLR. The HLR determines the service logic unit to provide the particular service responsive to at least one of the service call message requiring a particular service, a trigger indication and a subscriber profile associated with the subscriber. The call message requiring a particular service is transmitted from the HLR to the determined service logic unit.

BRIEF DESCRIPTION OF THE DRAWINGS

For a more complete understanding, reference is now made to the following description taken in conjunction with the accompanying Drawings in which:

FIG. 4a illustrates the origination request message transmitted from the MSC to the HLR;

FIG. 4b illustrates the origination request messages transmitted from the HLR to the service specific SCP;

FIG. 4c illustrates the origination request response message relayed from the service specific service control point to the HLR and back to the MSC;

DETAILED DESCRIPTION

Figure 1A:
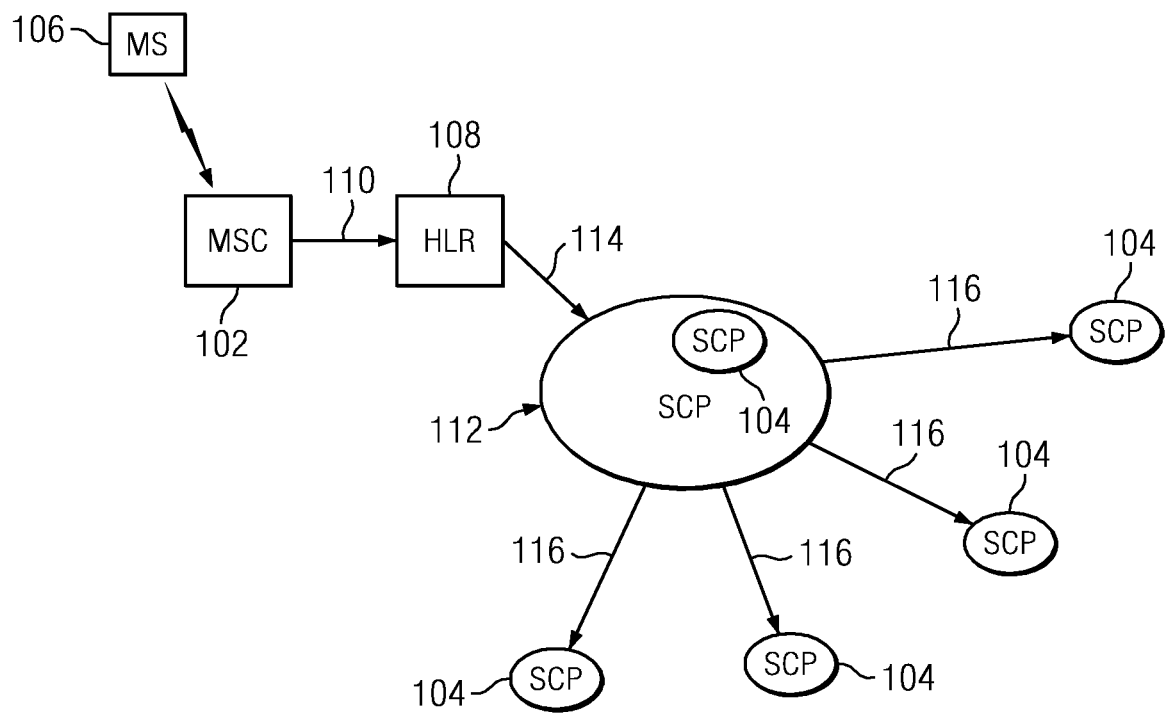
FIG. 1a illustrates the manner in which an origination request is transmitted from an MSC to various service specific SCPs.

Referring now to the drawings, wherein like reference numbers are used herein to designate like elements throughout, the various views and embodiments of a system and method for relaying an origination request from a home location register to a service specific service control point are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1a, there is illustrated the presently existing manner for forwarding an origination request (ORREQ) from a mobile switching center 102 to a selected one of a number of service specific service control points (SCPs) 104. The origination request is generated at the MSC 102 responsive to a call origination request from an associated mobile station 106. The origination request is transmitted from the MSC 102 to an HLR 108 over link 110. The HLR 108 forwards the origination request to a generic service control point 112 over link 114.

The generic SCP 112 does not provide the specific service needed. The generic SCP 112 makes a determination from the origination request as to which service specific SCP 104 is necessary to provide the WIN network functionalities that are required by the origination request. The generic SCP 112 forwards the origination request to a service specific SCP 104 over an associated link 116 or internally to a generic SCP functionality. The service specific SCP 104 provides the particular service to the associated mobile station 106 that is provided by service logic programs implemented within the service specific SCP 104.

As described previously, the manner for accessing the services provided by the service specific control point 104 requires relaying of the origination request from the MSC 102 to the HLR 108 to a first generic service control point 112 and finally to the service specific control point 104. Some manner for limiting the transmission pathway of the origination request would improve call processing capabilities and limit bandwidth requirements on the wireless network providing increased service benefits to the wireless network service provider and to the subscriber mobile stations utilizing the wireless network.

Figure 1B:
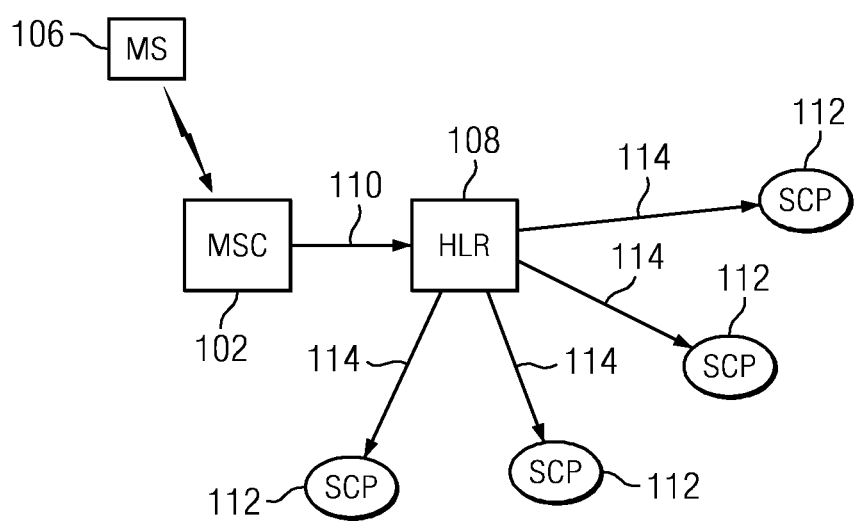
FIG. 1b illustrates an alternative manner for transmitting an origination request from an MSC to an SCP.

Referring now also to FIG. 1b, there is illustrated an alternative manner that an origination request may be transmitted from an MSC to an SCP. Rather than transmitting the origination request from the HLR 108 to a generic SCP and then onto a service specific SCP, the HLR 108 merely transmits the origination request to one of a number of generic SCPs 112. As before, the origination request is generated at the MSC 102 responsive to a call origination request from an associated mobile station 106. The origination request is transmitted from the MSC 102 to an HLR 108 over link 110. The HLR 108 forwards the origination request to a generic service control point 112 over one of the links 114. The generic SCP 112 will then provide the necessary service required in response to the origination request at whatever generic SCP 112 receives the origination request.

Figure 2:
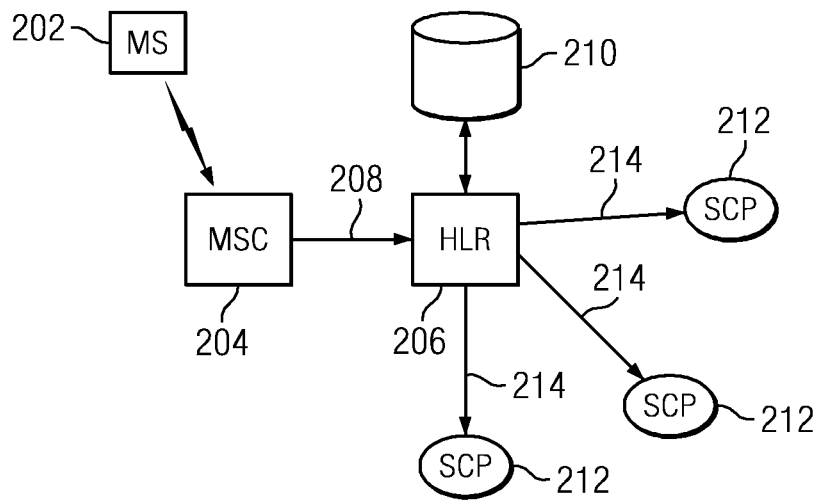
FIG. 2 illustrates the improved manner for transmitting an origination request from an MSC to a number of service specific SCPs.

Referring now to FIG. 2, there is illustrated an implementation of a process and system for relaying an origination request (ORREQ) in a manner that does not require the use of the generic service control point 112, but allows the origination request to be directly forwarded to a service specific service control point. In this case, a service request is provided from a mobile station 202 to the mobile switching center 204. Responsive to the service request, the mobile switching center 204 generates the origination request that is transmitted to the HLR 206 over link 208. Within the HLR 206 the origination request is examined along with the subscriber profile stored within a local database 210 of the HLR 206 to determine the particular services that are available to the mobile station 202. The HLR 206 utilizes the information within the origination request along with the subscriber profile information to determine which service specific SCP 212 is required to provide a requested service. The HLR 206 transmits the origination request directly to the service specific SCP 212 over an associated communications link 214.

The system and method described with respect to FIG. 2 has a number of advantages over that described with respect to FIG. 1 in that the intermediate transmission from the HLR to a generic service control point is eliminated. The use of the subscriber profile within the local subscriber database 210 enables a determination of the service that is available responsive to the ORREQ and enables determination of the service specific SCP 212 that can service the call. The process described with respect to FIG. 1 instead requires the transmission to the generic SCP 112 which makes the determination as to which service should be applied to the call. Thus, an entire link within the chain between the MSC 204 and the service specific service control point 212 is eliminated. Another advantage is that the HLR may also chose to relay original ORREQ message (received from MSC) without reconstructing to reduce complexity and processing.

The process described with respect to FIG. 2 also includes advantages over an existing process wherein responsive to receipt of the ORREQ by the HLR 108, the HLR 108 generates a service request (SERVREQ) message that is transmitted directly to a service specific service control point 104. While the SERVREQ process enables the elimination of the intermediate generic service control point step 112, a number of disadvantages over the implementation described with respect to FIG. 2 are present. The HLR 108 is required to fully deconstruct the ORREQ message and fully construct a SERVREQ message. Within the deconstruction, the HLR 108 must support the same or a subset of parameters between the two messages. Within the implementation described with respect to FIG. 2, all of the parameters are preserved without the need for an HLR interaction. Additionally, the HLR 108 is required to support a new SERVREQ message along with a new service ID parameter. The service specific service control point 104 is also required to support the new SERVREQ message along with a new service ID parameter. Also, the service specific SCP 103 must support two branches of logic to support the same service. In the wireless intelligent network (WIN), the SCP 104 will receive an ORREQ message. In a pre WIN case, the SCP must support receiving the SERVREQ plus the service ID. Thus, additional support for two different types of messages, the ORREQ and the SERVREQ messages are required in this implementation. In short, the SCP could receive the same ORREQ message relayed via the HLR as it would if it came directly from the MSC to the SCP.

Figure 3:
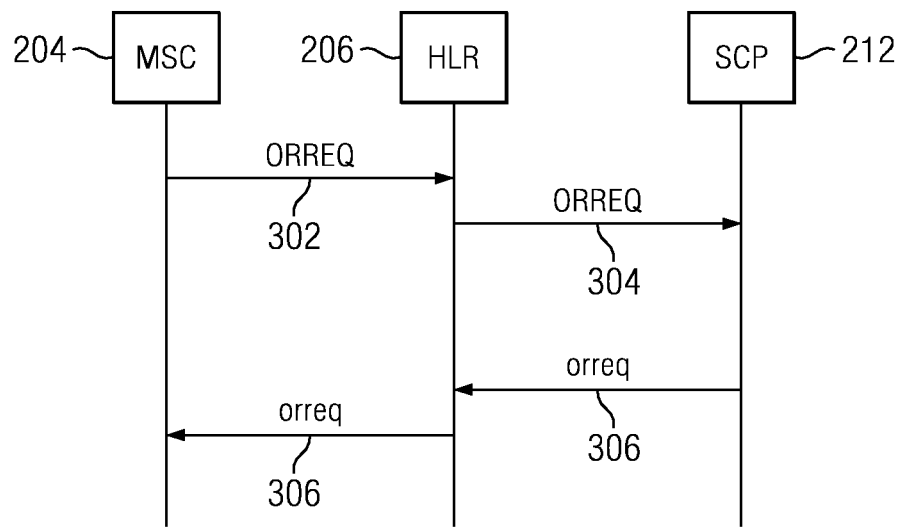
FIG. 3 is a signaling diagram illustrating the transmission of an origination request between an MSC and a service specific service control point and the transmission of the response to the origination request according to the present disclosure.

Referring now to FIG. 3, there is illustrated a signaling diagram illustrating the manner in which the ORREQ message is transmitted from the MSC 204 to the HLR 206 and finally to the service control points 214. Additionally, the orreq response from the SCP 212 back to the MSC 204 is illustrated. The MSC 204 responsive to requests for service from an associated mobile station generates the origination request 302 which is transmitted to the HLR 206. Referring now also to FIG. 4a, there is illustrated the configuration of the ORREQ message 302 transmitted from the MSC 204 to the HLR 206. The ORREQ message 304 includes a number of parameters including the BILLID parameter 402, the MIN parameter 404, the ESN parameter 406, the MSCID parameter 408, the PC SSN parameter 410, the DGTSDIAL parameter 412, the ORIGTRIG parameter 414, the TRANSCHP parameter 416 and the MSCCIN parameter 418.

The BILLID parameter 402 comprises a call ID parameter that is used for billing and redirection purposes when the ORREQ requires call routing. The MIN parameter 404 comprises the mobile identification number of the mobile station requesting the call service. The ESN parameter 406 comprises the electronic serial number of the mobile station requesting service. The MSCID parameter 408 comprises the ID of the mobile switching center providing service to the call. The PC_SSN parameter 410 comprises the point code sub-system number of the MSC serving the call. This is included if the SS7 carrier services are used. The DGTSDIAL parameter 412 comprises the digits that have been entered at the mobile station that is being served by the call and identify the called party. The ORIGTRIG parameter 414 comprises the origination trigger that indicates the trigger responsible for invoking a particular service. The TRANSCAP parameter 416 comprises the transaction capabilities parameter and indicates the transaction capabilities of the serving MSC 204 at the present time.

While the descriptions with respect to FIGS. 4a-4c describe a number of parameters that may be commonly found within the ORREQ request transmitted from the MSC to an SCP or in an orreq response transmitted from the SCP back to the MSC. These are only provided by way of one example and it should be realized that additional parameters or different combinations of the described parameters may be utilized within the ORREQ request and orreq response transmissions.

Referring now back to FIG. 3, once the HLR 206 receives the ORREQ 304 from the MSC, the HLR 206 determines which service specific SCP 212 the ORREQ should be forwarded to in the manner described hereinbelow and forwards the ORREQ 304 to the identified service specific SCP 212. Referring now also to FIG. 4b, there is illustrated the configuration of the ORREQ message 304 that is forwarded to the SCP 212 by the HLR 206 if the message is reconstructed by the HLR 206. While the implementation in FIG. 4b illustrates a situation wherein the ORREQ request is reconstructed within the HLR, rather than reconstructing the ORREQ request before it is transmitted to the service specific SCP the originally received ORREQ request from the MSC may be forwarded from the HLR 206 to the SCP 112 rather than reconstructing an ORREQ message for transmission to the SCP 112. It will also be possible to use some kind of combination of these processes wherein part of the message was forwarded and part was reconstructed at the HLR depending upon the particular implementation and requirements of the system. The parameters 402-418 are the same as those described previously with respect to FIG. 4a that are transmitted in the ORREQ message 304 from the MSC 204 to the HLR 206. Added on to the ORREQ message 304 is the parameter SENDRIN parameter 420. The SENDRIN parameter 420 comprises the sender identification number of the HLR 206 and indicates to the SCP 212 the identity of the HLR 206 that has transmitted the ORREQ message 304. This would not be necessary if the message was not deconstructed.

In response to the successful relay of an origination request to the SCP 212, the origination request response message (orreq) 306 is transmitted back from the SCP 212 to the HLR 206. The orreq response message 306 is relayed from the HLR 206 back to the serving MSC 204. Referring now also to FIG. 4c, there is illustrated the orreq response message 306 transmitted from the SCP 212 to the HLR 206 and from the HLR 206 to the serving MSC 204. The orreq response message 306 includes a number of parameters including the TERMTRIG parameter 422, the ACTCODE parameter 424, the ANNLIST parameter 426, the routing info parameter 428 and the DMH data parameter 430.

The TERMTRIG parameter 422 comprises the termination trigger points that are currently active for the mobile station. These parameters are only included if applicable. The ACTCODE parameter 424 comprises the action code parameter that identifies the action to be performed if the particular action to be performed is not implied to the presence of other system parameters. The ANNLIST 426 includes a list of tones or announcements that are to be played to the mobile station. If the ANNLIST parameter 426 is not included in the announcements based upon other parameters within the orreq response reply 306. The routing info parameter 428 comprises call routing information. The routing info parameter 428 may include information such as termination lists comprising various call termination information, routing digits comprising special routing instructions, the routing digits parameters are included if applicable and are not specified within the termination list parameter. The carrier digits parameter comprises the calling subscriber's PIC. The carrier digits parameter is included if applicable and is not specified within the termination list parameter. The DMH data parameters 430 comprise data for DMH recording purposes. They can include information such as the DMH account code digits, the DMH alternate billing digits, the DMH billing digits, the DMH redirection indicator, and the mobile directory number.

Figure 5:
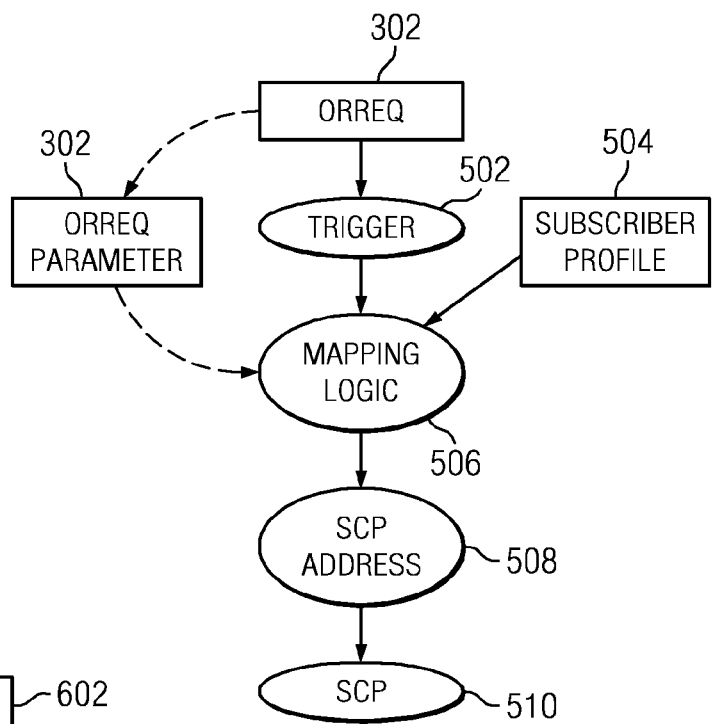
FIG. 5 illustrates the manner in which the home location register processes the origination request to determine the particular service specific SCP needed to provide services requested by the origination request.

Referring now to FIG. 5, there is illustrated the process occurring within the HLR 206 from the origination request 302 that is received at the HLR 206. The determination of a service specific SCP may be accomplished in a number of fashions. In one embodiment, a service trigger 502 is obtained from the ORREQ 302 by the HLR 206. The HLR 206 additionally determines from the ORREQ 302 the subscriber profile 504 associated with the user that has caused the generation of the ORREQ 302. Utilizing mapping logic 506 within the HLR 206, the HLR 206 may determine SCP address 508 necessary to provide the service required by the ORREQ 302. The mapping logic 506 determines the SCP address 508 utilizing the trigger 502 indicated within the ORREQ 302 and the information within the subscriber profile 504 of the associated user. By utilizing the provided SCP address 508 the HLR may forward the ORREQ 302 as it was received from the associated MSC to the service specific SCP 510 that provides the service required by the trigger 502 that is within the ORREQ 302.

In an alternative embodiment, rather than utilizing the trigger 502 and subscriber profile 504, the ORREQ parameter 302 itself may be utilized in combination with the subscriber profile 504 to determine the SCP address 508 and SCP 510 utilizing the mapping logic 506. Alternatively, the mapping logic 506 could utilize only the ORREQ parameter 503 or a combination of the ORREQ parameter 503 and the service trigger 502 or a combination of the ORREQ parameter 302, service trigger 502 and the subscriber profile 504. Any combination of these factors may be utilized by the mapping logic 506 in order to determine a service specific SCP 510 and its associated SCP address 508 by the HLR 206 for forwarding of the ORREQ 302 to the SCP 510.

Figure 6:
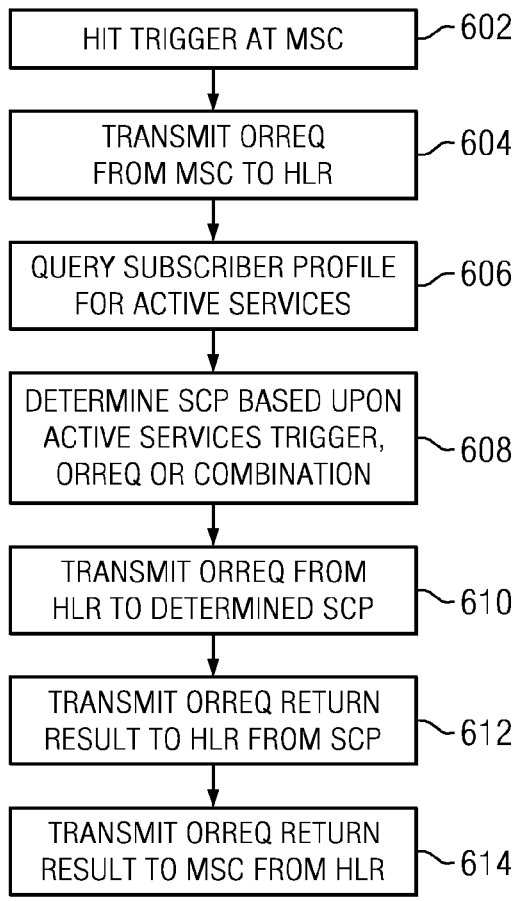
FIG. 6 is a flow diagram describing the operation of the manner for forwarding an origination request from an MSC to a service specific SCP according to the present disclosure.

Referring now to FIG. 6, there is illustrated a flow diagram describing the process for relaying an origination request from an MSC 204 to a service specific service control point 212. Initially, at step 602, a detection point is hit at the MSC 204 that is serving the mobile station causing the generation of a trigger. Responsive to the trigger, the MSC 204 generates an ORREQ that is transmitted from the MSC 204 to the HLR 206 at step 604. Upon receipt at the HLR 206, the subscriber profile associated with the mobile station that has generated the trigger is queried at step 606 by the mapping logic 506 to determine the active services that are available to the mobile station associated with the trigger.

Based upon any number of combinations of the active services available to the mobile station, the trigger that has been received within the origination request and the ORREQ request itself, a determination is made at step 608 by the mapping logic 506 of the service specific SCP 312 that can provide the services required by the trigger and indicated by the subscriber profile. The HLR 206 transmits at step 610 the origination request from the HLR to the determined service specific service control point 212. After receiving the origination request from the HLR 206, the SCP 212 determines which services to apply for the mobile station via the destination address indicated within the origination request. After successful receipt of the origination request at the service specific service control point 212, an origination request return result is provided to the HLR from the SCP at step 612, and the HLR relays the ORREQ return result to the MSC from the HLR at step 614.

Figure 7:
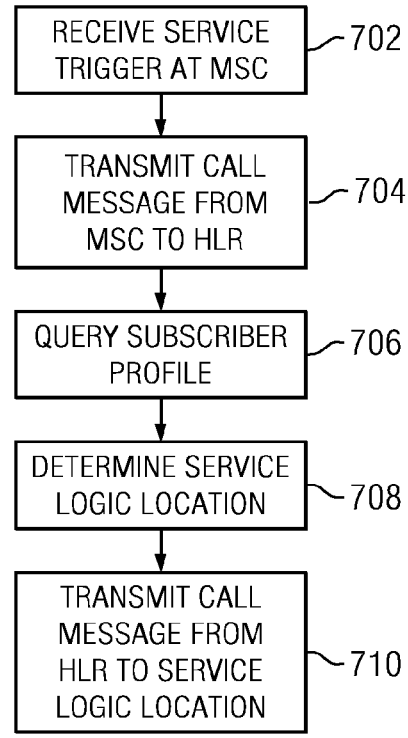
FIG. 7 is a flow diagram illustrating a more generic manner for providing a call message to a service logic unit.

Referring now to FIG. 7, there is illustrated a flow diagram describing the manner in which any particular type of service requirement raised by a user request can utilize the subscriber profiles within the HLR subscriber database to determine a location of any particular service logic to provide the service. A service trigger requiring a particular service logic is received at step 702 from a mobile device at the serving MSC. A call message including information about the service trigger is transmitted at step 704 from the MSC to the home location register of the subscriber requesting the service. The subscriber profile within the subscriber database is queried at step 706 using HLR mapping logic such that the identity of the service logic that can provide a service associated with the trigger and its location may be determined at step 708. Upon determination of the location of the service logic, the call message is forwarded at step 710 from the HLR to the identified location of the service logic.

Using the above-described system and method, an origination request or any other type of call message requiring a particular service logic may be sent directly from the HLR to either a specific service SCP or some other service logic location based upon an analysis of the triggers initiating the requested service and the subscriber profile contained within the subscriber database at the HLR.

It will be appreciated by those skilled in the art having the benefit of this disclosure that this system and method for relaying an origination request from a home location register to a service specific service control point provides an improved operation of a wireless network. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for relaying an ORREQ (origination request) message from an MSC (mobile switching center) to a service specific SCP (service control point), comprising the steps of:
    receiving at the MSC from a subscriber a service trigger indication to provide a particular service;
    transmitting the ORREQ message having the service trigger indication included therein from the MSC to an HLR (home location register), wherein the HLR does not know the service specific SCP required to provide the particular service;
    determining at the HLR the service specific SCP to provide the particular service associated with the service trigger indication of a plurality of available service specific SCPs responsive to at least one of the ORREQ message, the service trigger indication within the ORREQ message and a subscriber profile identified by the ORREQ message associated with the subscriber within the HLR, wherein the step of determining further comprises the steps of:
        determining the service trigger and an identifier for the subscriber from the ORREQ;
        accessing the subscriber profile responsive to the determined identifier to identify active services for the subscriber;
        determining the service specific SCP to provide the particular service responsive to the service trigger and the active services for the subscriber;
        determining an address of the specific SCP by accessing mapping logic; and
    transmitting the ORREQ message from the HLR to the determined service specific SCP of the plurality of available service specific SCPs to enable the determined service specific SCP to provide the particular service to the MSC.

2. The method of claim 1 further including the step of transmitting an ORREQ reply response message from the service specific SCP to the MSC through the HLR.

3. The method of claim 1, wherein the particular service comprises a WIN (wireless intelligent network) service provided by the service specific SCP.

4. The method of claim 1, wherein the MSC comprises a pre-WIN (wireless intelligent network) MSC.

5. A method for relaying a call message requiring a particular service from an MSC (mobile switching center) to a service logic unit, comprising the steps of:
    receiving at the MSC from a subscriber a service request to provide a particular service;
    transmitting a call message including a service trigger indication requiring the particular service from the MSC to an HLR (home location register), wherein the HLR does not know the service logic unit required to provide the particular service;
    determining at the HLR the service logic unit to provide the particular service associated with the service trigger indication of a plurality of available service logic units responsive to at least one of the call message requiring a particular service, the service trigger indication within the call message and a subscriber profile identified by the call message associated with the subscriber within the HLR, wherein the step of determining further comprises:
        determining the service trigger and an identifier for the subscriber from the call message;
        accessing the subscriber profile responsive to the determined identifier to identify active services for the subscriber;
        determining the service logic unit to provide the particular service responsive to the service trigger and the active services for the subscriber;
        determining an address of the service logic unit by accessing mapping logic; and
    transmitting the call message requiring the particular service from the HLR to the determined service logic unit of the plurality of available service logic units to enable the determined service logic units to provide the particular service to the MSC.

6. The method of claim 5, wherein the particular service comprises a WIN (wireless intelligent network) service provided by the service logic unit.

7. The method of claim 5, wherein the MSC comprises a pre-WIN (wireless intelligent network) MSC.

8. A wireless network, comprising:
    a mobile switching center (MSC) for controlling access to the wireless network by at least one subscriber;
    a service specific service control point (SCP) for providing a particular service to the at least one subscriber responsive to an origination request (ORREQ) message;
    a home location register (HLR) including a subscriber database for storing subscriber profiles for the at least one subscriber and mapping logic for determining a service control point responsive to at least one of the ORREQ message and a trigger indication within the ORREQ message, wherein the HLR does not know the service control point for providing the particular service;
    wherein the MSC receives a service trigger to provide the particular service at the MSC from a subscriber and transmits the ORREQ message from the MSC to the HLR responsive to receipt of the service trigger; and
    wherein the HLR determines the service specific SCP to provide the particular service of a plurality of available service specific SCPs responsive to at least one of the ORREQ message and the trigger indication within the ORREQ message and a subscriber profile associated with the subscriber within the HLR by accessing the subscriber profile and the mapping logic at the HLR and transmits the ORREQ message from the HLR to the determined service specific SCP of the plurality of available service specific SCPs to enable the determined service specific SCP to provide the particular service to the MSC.

9. The wireless network of claim 8, wherein the HLR further determines the service trigger and an identifier for the subscriber from the ORREQ and accesses the subscriber profile in the subscriber database responsive to the determined identifier to identify active services for the subscriber to determine the service specific SCP providing the particular service responsive to the service trigger and the active services for the subscriber.

10. The wireless network of claim 9, wherein the HLR further determines an address of the service specific SCP.

11. The wireless network of claim 10 wherein the HLR accesses a trigger address list to determine the address of the service specific SCP.

12. The wireless network of claim 8 service specific SCP transmits an ORREQ reply response message from the service specific SCP to the MSC through the HLR.

13. The wireless network of claim 8, wherein the particular service comprises a WIN (wireless intelligent network) service provided by the service specific SCP.

14. The wireless network of claim 8, wherein the MSC comprises a pre-WIN (wireless intelligent network) MSC.

15. A method for relaying an ORREQ (origination request) message from an MSC (mobile switching center) to a service specific SCP (service control point), comprising the steps of:

receiving at the MSC from a subscriber a service trigger to provide a particular service;

transmitting the ORREQ message from the MSC to an HLR (home location register), wherein the HLR does not know the service specific SCP required to provide the particular service;

determining at the HLR the service specific SCP to provide the particular service of a plurality of available service specific SCPs responsive to a user profile identified by the ORREQ message, wherein the step of determining further comprises:

determining the service trigger and an identifier for the subscriber from the ORREQ;

accessing the subscriber profile responsive to the determined identifier to identify active services for the subscriber;

determining the service specific SCP to provide the particular service responsive to the service trigger and the active services for the subscriber;

determining an address of the service specific SCP by accessing mapping logic; and transmitting the ORREQ message from the HLR to the determined service specific SCP of the plurality of available service specific SCPs to enable the determined service specific SCP to provide the particular service to the MSC.

* * * * *